(12) United States Patent
Bertolotti et al.

(10) Patent No.: US 8,831,907 B2
(45) Date of Patent: Sep. 9, 2014

(54) ANGULAR POSITION ENCODER FOR A ROTATING SHAFT

(71) Applicant: SSB Wind Systems GmbH & Co. KG, Salzbergen (DE)

(72) Inventors: Fabio Bertolotti, Bad Bentheim (DE); Sebastian Sbonnik, Bad Iburg (DE); Thomas Sumbeck, Schüttorf (DE)

(73) Assignee: SSB Wind Systems GmbH & Co. KG, Salzbergen (DE)

( * ) Notice: Subject to any disclaimer, the term of this patent is extended or adjusted under 35 U.S.C. 154(b) by 0 days.

(21) Appl. No.: 13/921,580

(22) Filed: Jun. 19, 2013

(65) Prior Publication Data

US 2014/0156221 A1 Jun. 5, 2014

(30) Foreign Application Priority Data

Jun. 20, 2012 (DE) .......................... 10 2012 012 308

(51) Int. Cl.
| | |
|---|---|
| *G01D 5/20* | (2006.01) |
| *G01P 21/02* | (2006.01) |
| *G01B 21/22* | (2006.01) |
| *G01P 3/66* | (2006.01) |
| *G01D 5/245* | (2006.01) |

(52) U.S. Cl.
CPC ...... *G01D 5/20* (2013.01); *G01P 21/02* (2013.01); *G01B 21/22* (2013.01); *G01P 3/66* (2013.01); *G01D 5/2457* (2013.01)
USPC ........................................................ 702/151

(58) Field of Classification Search
CPC .............. F03D 11/0091; Y02E 10/723; G01D 5/24476
USPC ........................................................ 702/151
See application file for complete search history.

(56) References Cited

U.S. PATENT DOCUMENTS

| | | | |
|---|---|---|---|
| 5,263,261 A * | 11/1993 | Piety et al. | 33/645 |
| 7,437,264 B2 * | 10/2008 | Pierce et al. | 702/151 |

(Continued)

FOREIGN PATENT DOCUMENTS

| | | |
|---|---|---|
| DE | 29815905 U1 | 2/1999 |
| DE | 20007984 U1 | 9/2000 |

(Continued)

OTHER PUBLICATIONS

Baumer Group: Sensorama, Innovation and Technology, Edition Jan. 2011. CH-8501 Frauenfeld, Nov. 2011. 24, 25—Company publication.
DPMA Office Action dated Jun. 20, 2012.
DPMA Office Action dated Jun. 20, 2012 Machine Translation.

*Primary Examiner* — Sujoy Kundu
*Assistant Examiner* — Ricky Ngon
(74) *Attorney, Agent, or Firm* — Harness, Dickey & Pierce, P.L.C.

(57) ABSTRACT

An angular position encoder for a rotating shaft is disclosed, in particular for application on the rotor shaft in wind turbines. A materialized measure in the form of a roller chain is arranged around the circumference of the shaft. A scanning head in the form of a sensor is arranged at a distance from the materialized measure and scans the surface of the materialized measure as the shaft is rotating. A measurement value evaluation unit processes recorded measurement values to give positional and/or speed data on the shaft. A method for determination and measurement of the rotor speed or position for a rotating shaft by means of the angular position encoder is also disclosed which includes determination and measurement of the rotor speed or position, creating or mapping at least one reference pattern or map of the chain, and a comparing the pattern and an actual measurement value.

29 Claims, 9 Drawing Sheets

(56) References Cited

U.S. PATENT DOCUMENTS

| | | |
|---|---|---|
| 2006/0012182 A1* | 1/2006 | McCoin ............... 290/55 |
| 2008/0200079 A1* | 8/2008 | Jansen ................ 440/1 |
| 2011/0140422 A1* | 6/2011 | Menke ................ 290/44 |
| 2011/0215587 A1* | 9/2011 | Lee et al. ............ 290/55 |
| 2012/0041711 A1* | 2/2012 | Jacoby et al. ........ 702/151 |
| 2012/0065901 A1* | 3/2012 | Bechhoefer et al. ... 702/34 |

FOREIGN PATENT DOCUMENTS

| | | |
|---|---|---|
| DE | 2844584 A1 | 6/2011 |
| DE | 2918498 A1 | 6/2011 |
| DE | 202009017132 U1 | 6/2011 |
| EP | 1211482 B1 | 6/2002 |

* cited by examiner

| | Fall 1 | Fall 2 | Fall 3 | Fall 4 | Fall 5 | Fall 6 | Fall 7 | Fall 8 |
|---|---|---|---|---|---|---|---|---|
| X1 | 0 | 0 | 1 | 1 | 1 | 0 | 0 | 1 |
| Slope 1 | 0 | 1 | 1 | 0 | 0 | 0 | 1 | 1 |
| X2 | 1 | 0 | 0 | 1 | 0 | 0 | 1 | 1 |
| Slope 2 | 0 | 0 | 1 | 1 | 0 | 1 | 1 | 0 |

FIG - 9

ANGULAR POSITION ENCODER FOR A ROTATING SHAFT

CROSS-REFERENCE TO RELATED APPLICATIONS

This application claims the benefit and priority of German Application No. 10 2012 012 308.6, filed Jun. 20, 2012, granted on Feb. 28, 2013 as DE 10 2012 012 308 B3. The entire disclosure of the above application is incorporated herein by reference.

FIELD

The present disclosure concerns an angular position encoder for a rotating shaft, and in particular for use of an angular position encoder in a wind turbine. The present disclosure further concerns a method for determining and measuring the rotor speed or position for a rotating shaft by means of an angular position encoder.

BACKGROUND

This section provides background information related to the present disclosure which is not necessarily prior art.

Angular position encoders are measuring systems for a rotating shaft and are used, for example, in the rotors of a wind turbine. Their purpose is to determine the rotor position and/or speed of such a system, wherein the rotor of a wind turbine has a rotor hub with perpendicularly protruding rotor blades and a rotor shaft, which is mechanically coupled to a generator for power generation.

An angular position encoder has a scanning head arranged on the rotating shaft and detects or measures by means of a sensor array arranged in the scanning head, working optically, electrically or magnetically, the position of the shaft. From the sensor signals identified, by means of a measurement value evaluation, actual positional values of the shaft are generated. By means of a time measurement from the positional measurements actual rotor speeds can be identified. The positional and speed data identified in this way are passed to a system controller, which generates from them control and/or regulation signals for the wind turbine. The positional data is required to have a very high degree of accuracy, since measurement errors lead to incorrect control and regulation values for the system.

An angular position encoder arrangement referred to as an angular measurement system is disclosed, for example, in DE 298 15 905 U1. The known arrangement has a materialized measure in the form of a disc on the outer circumference of a shaft, on the circumference of which a measuring element is shown as a materialized measure, which according to the scanning principle meets the requirements for normal optoelectronic, magnetic, inductive or capacitive scanning heads.

The leaflet from the Baumer Group, "Baumer, Sensorama, Innovation and Technology", issue January 2011, shows an arrangement referred to as a "magnetic tape encoder", which discloses a materialized measure in the form of a magnetic tape, which is scanned by a scanning head. The magnetic tape encoder is strapped onto a shaft by means of a buckle like a waist belt. Two sensors integrated into the scanning head detect the magnetic field of the tape and in an evaluation unit generate a measurement signal, from which via an arc tangent function positional values for the shaft are identified. The scanning takes place without interruption over the buckle and over any breaks in the materialized measure, without signals or pulses being lost. The known magnetic tape encoder allows retrofitting, in particular in larger shaft diameters, such as for example those of the rotor shaft of a wind turbine.

The known angular position encoders have considerable disadvantages, however, in particular when used on the rotor shaft of a wind turbine. On the one hand they must be highly resistant to vibrations and also operate reliably under extreme environmental influences such as for example those of the high seas in offshore use. At the same time, however, high measurement accuracy in determining the position is necessary in order to achieve the levels of measurement accuracy mentioned above. With the magnetic materialized measure, there is also a danger that metallic foreign bodies or strong magnetic fields will damage the tape and the measurement results will be falsified.

Conventional angular position encoders meet these requirements only to a limited extent, since in particular the recording of the measurement values from the magnetic tape encoders during heavy duty wind power operation is very difficult so that such angular position encoders are very expensive.

Furthermore, the measurement value recording has major sources of error due to inadequate recalibration, synchronization and measurement value resolution. For the control of wind turbines in the offshore area, for example, scanning rates of the angular position encoder of approximately 10-12 bits are normal. This corresponds to a measurement accuracy of approximately 0.1-0.2 degrees in relation to the shaft diameter.

SUMMARY

This section provides a general summary of the disclosure, and is not a comprehensive disclosure of its full scope or all of its features including improvements for an angular position encoder, in particular for use in wind turbines, such that it forms a robust, cost-effective and at the same time very accurate measuring system.

An angular position encoder is provided with a scanning head in the form of a sensor, which uses as a materialized measure a roller chain with chain elements, the inner rollers or pins of which are aligned in the axial direction of a rotating shaft. "Scanning" as used herein means measuring the distance between the chain surface and the sensor.

Roller chains are robust and mass-produced products, the dimensions and design of which are standardized at national and international level (e.g. DIN 8187, DIN ISO 81889, inter alia). They are accordingly significantly cheaper than a specially manufactured materialized measure. The angular position encoder disclosed herein is easily adaptable to any shaft circumference, experiences virtually no mechanical wear and requires no complicated coded divisions on the measurement tape or flange for the materialized measure. Test measurements have shown that the position and speed values identified with the angular position encoder disclosed herein provide a measurement accuracy of 0.15 degree in relation to the rotor circumference. It therefore meets the measurement accuracy requirements for use in wind turbines.

The inner rollers or pins of the chain are aligned axially in the direction of the shaft and radially in the direction of the scanning head in the form of a sensor, wherein the chain is secured with a non-positive form-fit to protect the rotor shaft and to combat vibrations, at the circumference of the rotor. The chain elements arranged on the circumference, which are always the same, guarantee easy and wear-free measurement value recording. The measurement values can be read out by a controller and via a suitable bus or communication system made available to other systems. For rotating shafts the sensor detects the distance to each chain element with its inner rollers or pins and from this identifies, via a corresponding measurement value evaluation, positional and speed data on the shaft. As the materialized measure the chain elements already have an incremental division of the rotor surface, which thus in principle can be recorded by all commercially available sensors. This includes both analogue and digital sensors. The detected sensor signals are passed to a corresponding digital or analogue measurement value evaluation unit and there, by means of the measurement method described in more detail below are processed to give actual positional and angular data for a rotating shaft, in particular for a rotating shaft of a wind turbine.

Any excessive distance of the individual chain elements, which would negatively affect the measurement accuracy, is advantageously compensated for by means of the mapping process. In this step of the method a kind of map of the materialized measure, that is to say the chain, is created, in order to be able to use this as a reference pattern for determining the position of the shaft. It comprises the recording and storage of a signal minimum and maximum, identification of the offset of a chain element from the minimum and maximum values of the signal and identification of the amplitude. A comparison is then made between at least one pattern and an actual measurement value (scanning).

Because the distance of the inner rollers or pins of the chain or one of its individual elements is always the same, it is advantageous to provide a measurement system for the scanning that gives the actual distance. Thus, commercially available proximity sensors with an analogue/digital output can be used, which are able to scan the full width of the chain. The test measurements by the applicant referred to above have shown that analogue proximity sensors with the corresponding design of the locking and a corresponding measurement algorithm meet the required measurement accuracy. Because of the design of the chain elements with the regular sequence of inner rollers or pins a quasi-sinusoidal analogue sensor signal is generated already during scanning, which gives the distance of the scanned surface of the inner rollers or pins with sufficient accuracy. The sinusoidal signal can be further processed to directly provide the determination of the position or angle of the shaft.

In a further advantageous configuration, two inductive analogue sensors with a fixed and specified distance are used, as a result of which the measurement accuracy can be further increased. The second sensor is used firstly for redundancy, should the first fail, so that the angular position encoder remains in service until the next scheduled maintenance date. In addition by using at least two sensors, measurement values can also be provided if the chain lock is directly beneath one of the two sensors. Furthermore the two or more sensor configuration offers the possibility of performing an additional plausibility test of the sensor signals. In addition, through the use of two sensors measurement values can also be made available if a chain lock or a chain link is directly below one of the two sensors.

For determining the position of the shaft prior to a measuring process the exact determination of a so-called synchronization or zero point on the measuring element of the angular position encoder is necessary. A second sensor leads to a more accurate determination of this point.

Independently of the number of sensors advantageously in a memory of the measurement value evaluation unit the currently identified measurement values can be compared using the mapping. The measurement value evaluation of a sensor signal, which in inductive scanning is expediently present as a voltage signal, advantageously takes place in a sequential program with an algorithm which from the sensor signals determines the position and speed of the rotor shaft.

In order to be able to process the data from the sensor, a conventional analogue/digital converter can advantageously be used, by means of which the analogue measurement values of the sensor are converted into digital signals, which are then passed to a computer in the measurement value evaluation unit, are processed there and can then be compared with previously stored measurement values and evaluated. As an alternative to the computer and the A/D converter, this can also be performed by means of a microcontroller.

In order to protect the shaft, and for a non-slip stop, the chain used as a materialized measure must be secured with a non-positive form-fit by means of a chain connecting link that can be clamped to the circumference of the shaft. To this end between the chain and the shaft surface a non-slip strip is arranged as a shaft, slip and vibration protector. The strip can, for example be glued to the surface of the shaft. The strip advantageously has rubber-elastic properties with a matt surface. The material should furthermore be weather-proof and have a long service life.

The joining of the two chain ends to the shaft takes place using a connecting link that can be clamped. The clamping area of the connecting link should be as small as possible, in order not to falsify the scanning values. This means that a conventional chain link or chain connector cannot be used here, because the number of chain elements in respect of the shaft circumference is not always an even number. Advantageously the clamping element has two identically designed elements extending in the axial direction, each of which is connected on one side by means of a pin with the chain end. The two ends can advantageously be clamped by means of screws. The chain connecting link also advantageously serves as a synchronization point for the position determination, since this link can be distinguished by the sensor from the other chain links.

The chain requires one or more guide devices on the shaft circumference so that it cannot move to the side. To this end it is proposed that the guide device has a groove on its scanning surface in which the chain is guided, wherein the scanning surface has a curvature to match the radius of curvature of the shaft, in order to guarantee the minimum possible distance from the chain.

The scanning head is advantageously integrated with the at least one sensor and the measurement value recording into one of the at least one guide devices. The at least one sensor, the scanning head and one of the guide devices are thus integrated into a single housing. In this way advantageously optimum scanning of the chain is ensured. The housing formed in this way should furthermore be designed to be robust and small enough that the measurement results are not further adversely affected.

The method for determining and measuring the rotor speed or position for a rotating shaft by means of the angular position encoder is advantageously initiated by the identification of parameters relevant to the measurement. This process is referred to in the following as configuration. In this measuring process a check is made that the A/D converter or the microcontroller is correctly connected with a bus connection. If this is the case, a configuration file is automatically loaded, which substantially comprises a calibration of the measurement system. This file contains the length of the synchronization gap at the chain tensioning device and the length of a chain element. If no errors have occurred, the search for the chain synchronization point is started. In this connection, reference is made to the fact that this 'search process' still does not involve a definitive determination of the synchronization point or sync point.

Once all the relevant data for the measurement have been recorded and identified in the configuration part of the program, according to the invention the mapping, the creation of the reference pattern of the chain, is started. This takes place by means of a first and, where present, then by means of the second sensor.

When creating the map, once the sync point has been passed each minimum and maximum of the signal voltage is recorded and stored. The output voltage of the sensor is a function of the distance between the material and the sensor. Accordingly, a maximum occurs in the middle between two neighboring inner rollers or pins of a chain element, since in this area the distance between the sensor and chain is great. A voltage minimum occurs at the ends of the chain element, if in each case an inner roller or pin of the chain is scanned by a sensor, since here the distance between sensor and chain is small.

At the sync point the maximum measurement value occurring is found. It is identified by scanning the chain over a number of rotations of the shaft, finding and storing the maximum voltage value. Then an average of the measured voltage values is taken and the average used as the synchronization voltage or sync voltage.

Half of the maximum–minimum difference gives the offset of a chain element. From the maximum–offset difference the amplitude of a chain element and thus the reference value (map) can be identified. The amplitude and the offset of each individual chain element can be stored in a special data structure or field (array), so that the map can be regularly updated. This prevents measurement errors and increases the accuracy of the measurement system, since the output voltage of the sensors is for example highly temperature-dependent. Thus, for example, at fixed intervals (e.g. every 100 rotations) a new mapping process can be started. Advantageously the map is automatically and constantly updated on the basis of the most recent rotations, so that a positional calculation is always possible.

The scanning step of the method comprises to begin with the precise identification of the synchronization point in each rotation. This determination of the exact sync point is very important. If this point moves by a certain amount, then the entire measurement also moves by the same amount. Thus the entire measurement result can be falsified. There are advantageously a total of four possible measurement methods for determining the sync point.

As the first possibility as the sync point a rising/falling edge of the maximum occurring voltage, including a small safety margin, can be triggered. The disadvantage of this method, however, is that the sync voltage could drop as a result of temperature changes, so that the sync point is no longer found. Furthermore, an edge of the sync voltage could be triggered at the wrong points by measurement errors or by excessive production tolerances for the shaft.

As a further possibility the sync point can be determined by the difference in voltage between two measurement values. Since the speed of the shaft is not constant, however, the size of this difference also changes as a function of the speed of rotation. When the rotor shaft is rotating quickly the delta is very great, since the individual measurement values are positioned further apart. During slower rotation the delta is very small. This disadvantage can be advantageously overcome by always comparing the same measurement points with one another (e.g. every ¼ chain element). To this end earlier measurement values are stored and the sync point identified via the actual speed with which the old measurement values exhibited the delta. The speed measurement identified from the positional data calls for a precise time measurement however.

As the third possibility the sync point can be identified by integration. If in an x, y coordinates system the area of a sine curve is integrated over a full period (sin(x) from 0 to $2\pi$), the result=0. This is also true for the integration of the signal of a chain element. Since the measurement signal in the x, y coordinates system is shifted in the positive Y direction, however, the offset from the map must then be subtracted. If the sensor passes over the gap at the chain connecting link or at the sync point, the integral of the chain element is not equal to 0. This effect can thus serve as a trigger. But this variant only functions reliably at constant rotation. If the speed changes or even if the shaft is at a standstill it is necessary to take this change in speed into account in the integral.

As the fourth and preferred possibility for sync point detection, a measurement value addition of two sensors spaced a certain distance apart can be used. The new overlaid function resulting from addition runs periodically. If one of the sensors passes over the sync gap, then there is a clear peak, which is approximately twice the greatest occurring amplitude. The positive edge of this peak can be reliably used as a trigger point. With two sensors both sensors also pass over the sync gap one after another. Thus two peaks occur one shortly behind the other. Both peaks can be used in order to identify the position of the sync point.

Once the sync point has been identified the determination of the position of the shaft takes place from a comparison of the reference pattern (map) with the actual measured value. This advantageously takes place initially via a so-called "global" and then via a "local" position determination.

The global position determination takes place through the recording of the number of chain elements multiplied by a chain element length in relation to the shaft circumference. The shaft circumference and the length of a chain element are known. When the shaft rotates the number of chain elements is counted. From the number of chain elements the software can identify the "rough" global position of the sensors. The global position calculation does not yet have the required measurement accuracy, however, that is for example necessary for an angular position encoder in a wind turbine. In order for example to achieve the 0.15 degrees measurement accuracy, therefore, a local position determination must also be performed.

The local position determination takes place according to the equation:

$$X = \sin^{-1}\left(\frac{y-D}{A}\right)$$

where

X is the local position of the respective chain element;
y is the measurement value of the sensor;
A is the amplitude of the respective chain element; and
D comprises the offset of the respective chain element.
In the event that in the above mentioned equation (y−D)/A≤1, an amount of ≤+1 or −1 is set.

For the identification of the exact shaft position advantageously an additional algorithm is used, which detects whether a clockwise or anticlockwise movement of the rotor shaft is taking place, that is to say in which part of the sine curve the sensor is directly located.

For clockwise motion the sensor signal (sine curve) is broken down into 4 areas, wherein it is detected if the sensor is in the positive or negative half-wave. The areas differ by at least one distinguishing feature (slope, half-wave).

For a position determination which takes account of both the clockwise and the anticlockwise direction of rotation of the shaft, a second sensor is similarly also necessary, since with one sensor alone both directions of rotation cannot be detected.

Instead of the four different cases, as with clockwise rotation, there are now a total of eight cases (four features each with two possibilities) to be distinguished. With two sensors two slopes are identified. Furthermore, the sign of the measurement value (positive or negative half-wave) can be detected twice.

A wind turbine is also disclosed as having a rotor that can rotate with the wind about a rotor axis, having a rotor hub, a rotor shaft and at least one rotor blade secured to the rotor hub and running in a direction substantially transverse to the rotor axis and at least one electrical generator, which is mechanically coupled to the rotor shaft and can be driven by it. The angular position encoder according to the invention is integrated into such a system and identifies the rotor position and rotor speed. The wind turbine can be further developed according to all configurations described herein in connection with the angular position encoder.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Further advantageous configurations follow from the subclaims, the drawing and the exemplary embodiment described further in the following.

Corresponding reference numerals indicate corresponding parts throughout the several views of the drawings.

DETAILED DESCRIPTION

Example embodiments will now be described more fully with reference to the accompanying drawings.

Figure 1:
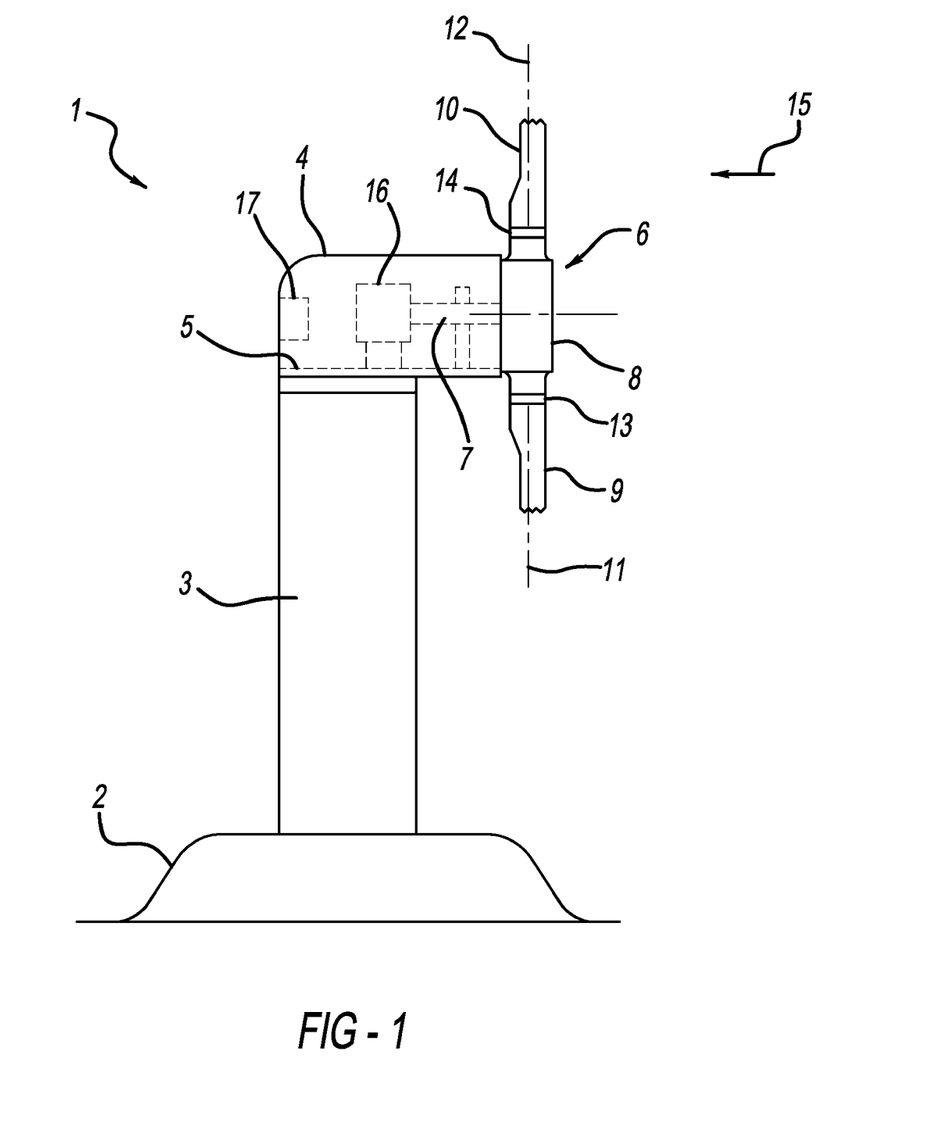
FIG. 1 is a schematic representation of a wind turbine.

In FIG. 1 a wind turbine 1 can be seen, wherein a tower 3 standing on a foundation 2 at its opposite end from the foundation 2 is connected to a machine housing 4. In the machine housing 4 a machine support 5 is arranged, upon which a rotor 6 is rotatably supported, having a rotor shaft 7 and a rotor hub 8 and associated rotor blades 9 and 10, which in each case can rotate about their blade axis 11, 12 relative to the rotor hub 8. The wind turbine 1 normally has three rotor blades, though in FIG. 1 only the two blades 9 and 10 are shown.

Each rotor blade 9, 10 is mechanically coupled to an adjusting drive 13, 14, by means of which the respective rotor blade 9, 10 is rotated about the associated blade axis 11 and 12 and via the rotor shaft 7 is mechanically coupled to an electric generator 16, which is arranged in the machine housing 4, secured to the machine support 5 and which converts the wind power 15 acting on the individual rotor blades to the largest possible extent into electrical energy. For the controlled operation of the wind turbine 1 a wind turbine controller 17 is provided, by means of which inter alia the adjusting drives 13 and 14 are controlled.

Figure 2:
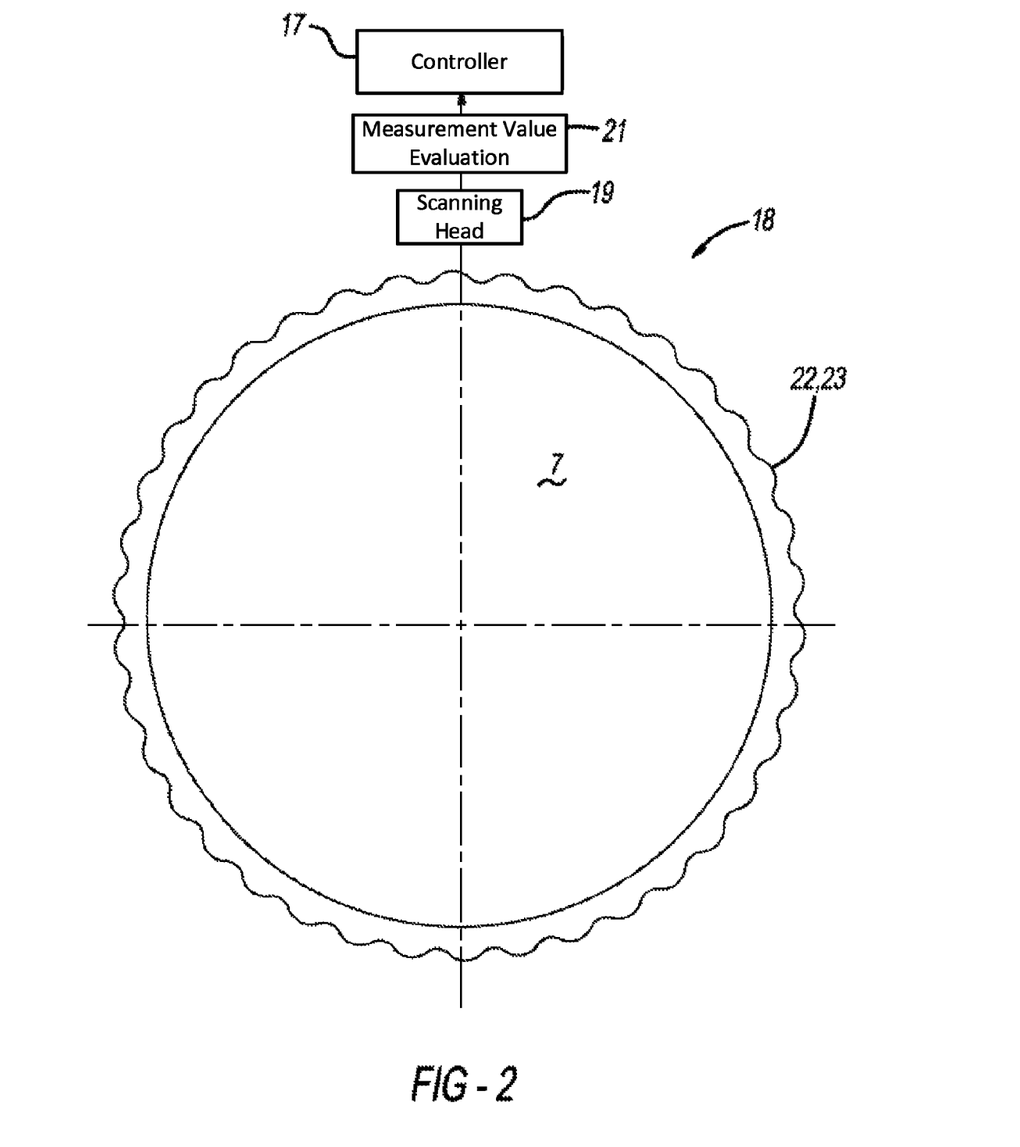
FIG. 2 is a schematic representation of a sectional representation of an angular position encoder for a rotor shaft of a wind turbine.

FIG. 2 shows a schematic sectional representation of the rotor shaft 7 of the wind turbine 1. The speed of the rotor 6 is variable and is adapted to the respective prevailing wind and weather conditions. For this positional and speed monitoring of the rotor 6 is necessary, which is positioned directly in the drive train on the rotor shaft 7 and which in each case detects the actual speed via position identification and passes this information to the system controller 17.

For this purpose the rotor shaft 7 has a measurement device referred to as an angular position encoder, measurement transducer, rotary encoder, angle encoder or rotor encoder. The angular position encoder 18 has a scanning head 19 arranged adjacent the rotating shaft and detects or measures by means of a sensor array arranged in the scanning head 19 the position of the part of the rotor 6 in the form of rotor shaft 7. From the sensor signals identified by means of a measurement value evaluation 21, actual positional values of the rotor 6 are generated.

The sensor unit has two analogue proximity sensors which are integrated into the scanning head 19. Both sensors A and B are given the reference 20 (FIG. 3) and have a scanning rate of approximately 1600 Hz, a switching distance of 0-4 mm and an analogue output voltage in the range 0-10 V. Thus the sensor signals are present in the form of analogue voltage values.

From the sensor signals identified by means of the measurement value evaluation unit 21, actual position values of the rotor or the rotor shaft are generated. In the measurement value evaluation unit 21 to this end, a software program is integrated with an algorithm which from the sensor signals during scanning identifies the position and speed of the rotor shaft. By means of a time measurement from the positional measurements, the actual rotor speeds or speed values can be identified, which are then passed to the wind turbine controller 17 (FIG. 1) and there processed to provide control and regulation values for the wind turbine 1, inter alia also for the two blade angle adjustment drives 13 and 14 shown in FIG. 1. Around the rotor shaft circumference a materialized measure 22 is arranged, which when the shaft 7 is rotating is scanned without contact by both sensors (20) (FIG. 3) of the scanning head 19.

Figure 3A:
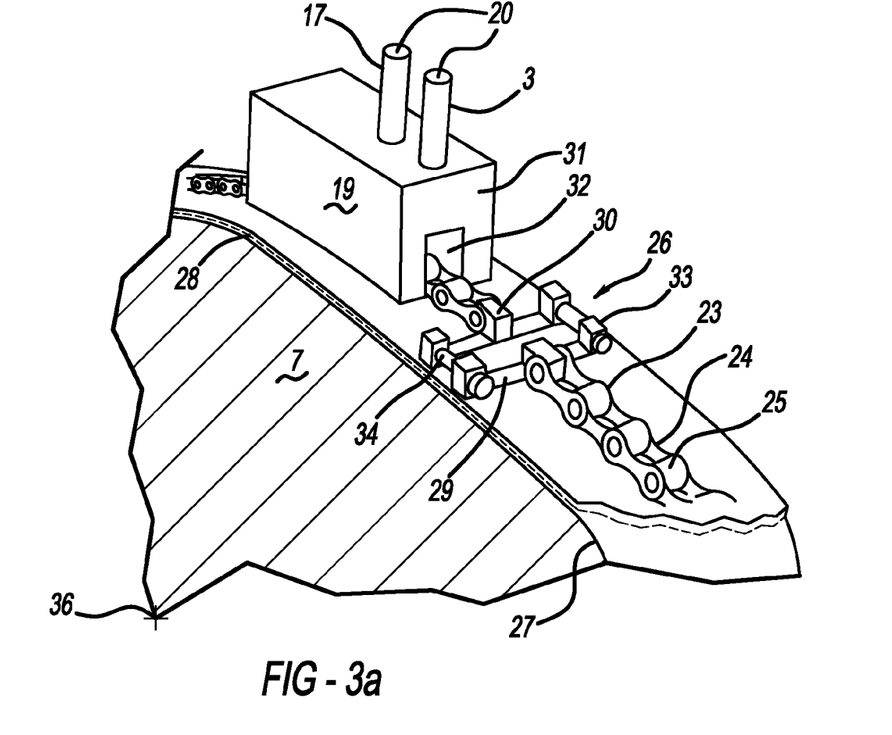
FIGS. 3a and 3b in each case show the detail of a materialized measure of the angular position encoder.
Figure 3B:
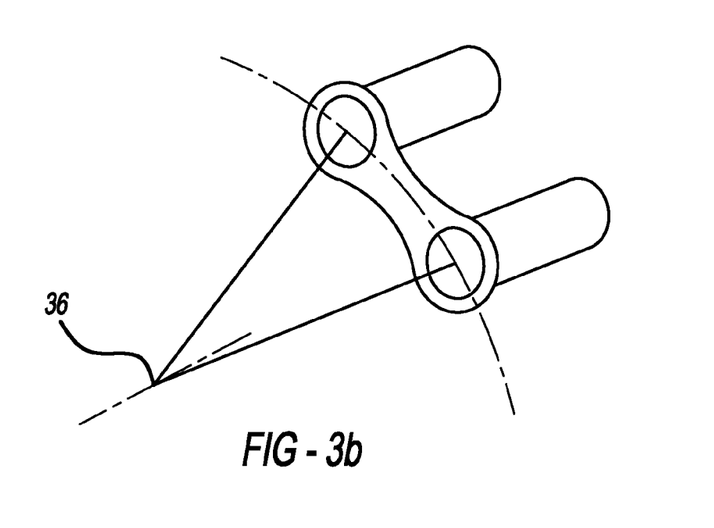

FIGS. 3a and 3b show details of the materialized measure 22 which takes the form of a roller chain 23 with chain elements 24. The inner rollers or pins of which are aligned in the axial direction of the rotating shaft 36, as shown in particular in FIG. 3b. In the exemplary embodiment, for the chain 23 a normal bicycle chain with a chain width of approximately 8 mm is used. The scanning head 19 is tailored to the chain 23.

The chain 23 is secured by means of the chain connecting link 26 to the surface of the rotor shaft 27 so that it can be clamped as can be seen in particular in FIG. 3a. In order to protect the shaft 7 and for a non-slip stop the chain 23 is clamped on a non-slip strip 28 in a rubber-like but also weather-proof material, which is glued to the surface of the shaft 27. The chain connecting link 26 has two identically designed retainers 29 each of which is connected on one side by a pin 30 with the chain 23. The two retainers 29 are connected by means of two adjustable screws with which the chain 23 is clamped.

For a clear measurement value evaluation of the sensor signals identified, the establishment of a zero point on the surface of the rotor blade 26 is necessary, by means of which the sensor signals identified can be synchronized. This synchronization point 33 (sync point) is expediently positioned in the gap 34, which occurs in the area of the chain connecting link 26. The two sensors A and B are arranged in the circumferential direction of the shaft 7 at a specific and permanently defined distance from one another. The sensor spacing is necessary in order to detect the direction of rotation of the shaft 7 in order in this way to allow a more accurate determination of the sync point 33.

The scanning head 19 with the two sensors 20 at the same time serves as a guide device 31 for the chain 23 and has a groove 32, in which the chain is guided. The scanning surface matches the radius of curvature of the shaft 7. The scanning head 19 is made from a non-magnetic material in order to prevent measurement errors by the two inductive sensors 20. The height of the two sensors 20 can be continuously adjusted in the scanning head 19.

Figure 4:
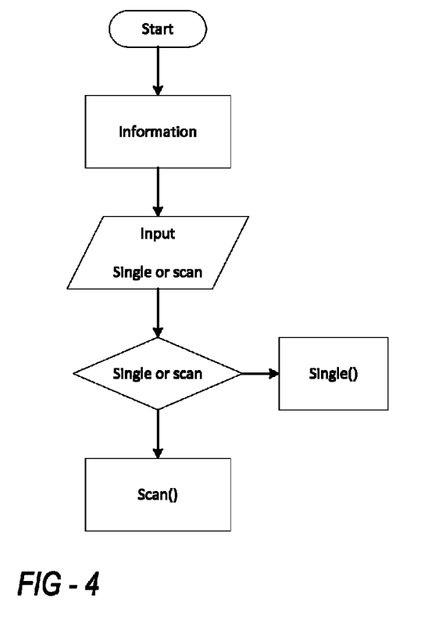
FIG. 4 shows a program flowchart (main) for a measurement value evaluation of the angular position encoder.

FIG. 4 shows a program flowchart for the software in the measurement value evaluation unit 21 (main), by means of which the position and speed of the rotor shaft is determined from the two sensor signals. The sequential program allows selection between individual measurement or "single" (FIG. 5) and continuous measurement or "scan" (FIGS. 6a to 6c), wherein the latter is the main program.

Figure 5:
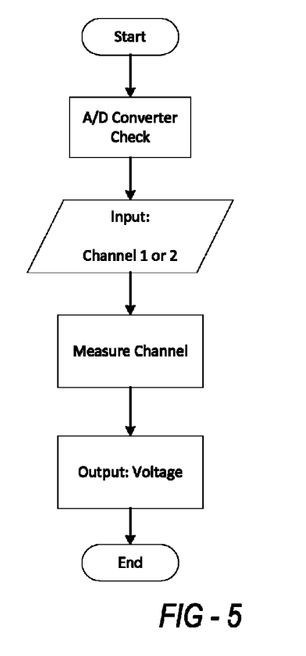
FIG. 5 shows the program sequence for a first program section of the program sequence according to FIG. 4.

The "single" sequence in FIG. 5 includes a check of the hardware of the measurement value evaluation unit 21. In the exemplary embodiment this comprises an analogue/digital converter check. A check is made that the parameters are in order (input channel 1 or 2). Then the recording of the voltage value (Output: Voltage) is started a selected analogue input. As an alternative to the A/D converter a microcontroller with a corresponding bus connection can also be used.

The continuous scan measurement constitutes the main program for the measurement value evaluation of the sensor signal. Following reading-in of the two sensors 20 an algorithm is run comprising three areas or program sections which are shown as program flowcharts in FIGS. 6a to FIG. 6c.

Figure 6A:
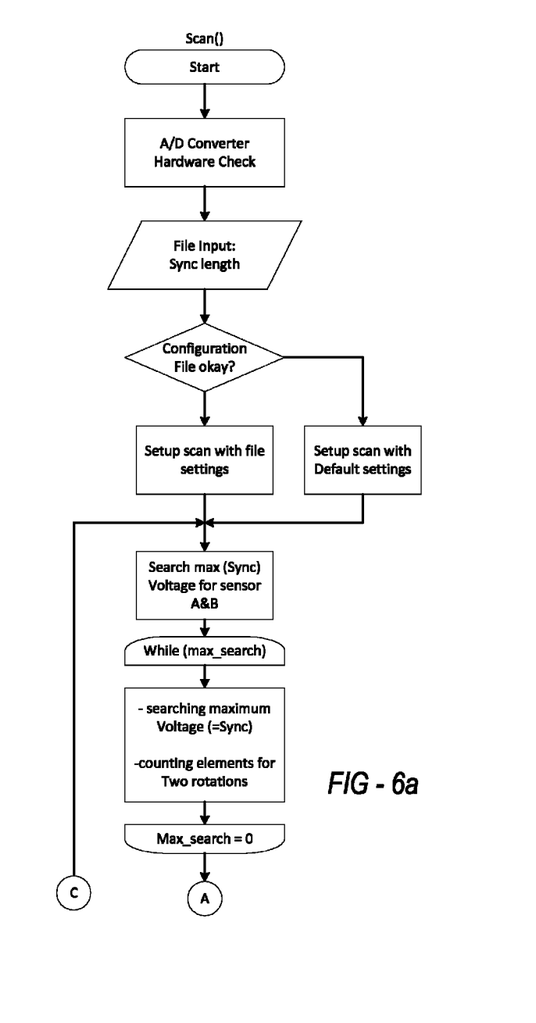
FIG. 6a to FIG. 6c show the program sequence for a second program section according to FIG. 4.

FIG. 6a shows the first program section of the scan program section, which is referred to as configuration and substantially comprises calibration of the measurement system. In the configuration program sequence the measurement process is started and all relevant parameters for the measurement are identified.

Initially a check is made of the hardware of the A/D converter used in the exemplary embodiment (A/D Converter Hardware Check). Then the length of the sync gap 34 at the synchronization point 33 (FIG. 3) is input (File Input: Sync Length) and the length of a chain element 24 (FIG. 3a). Once the measurement parameters have been input the actual scan file is loaded. If this file is not available or is corrupt, an error measurement occurs (Setup Scan with Default Settings).

The actual scan program begins with a search for the sync point 33 (FIG. 3a). Since at this point the maximum voltage occurs, this is what is sought (Search Max (Sync) Voltage for Sensor A &B). In order to guarantee a correct measurement of the sync voltage, the chain elements are also counted. Only if the number of chain elements counted for both sensors A and B is the same does the program continue. Then the calculation of the shaft circumference and the angular position of a chain element in relation to the sync point 33 (FIG. 3a) take place. The chain 23 (FIG. 3a) is scanned in seeking the maximum voltage (searching Maximum Voltage (=Sync)), which is then stored as the reference. This takes place for the two sensors 20 over two rotations (Counting elements for two rotations).

Figure 6B:
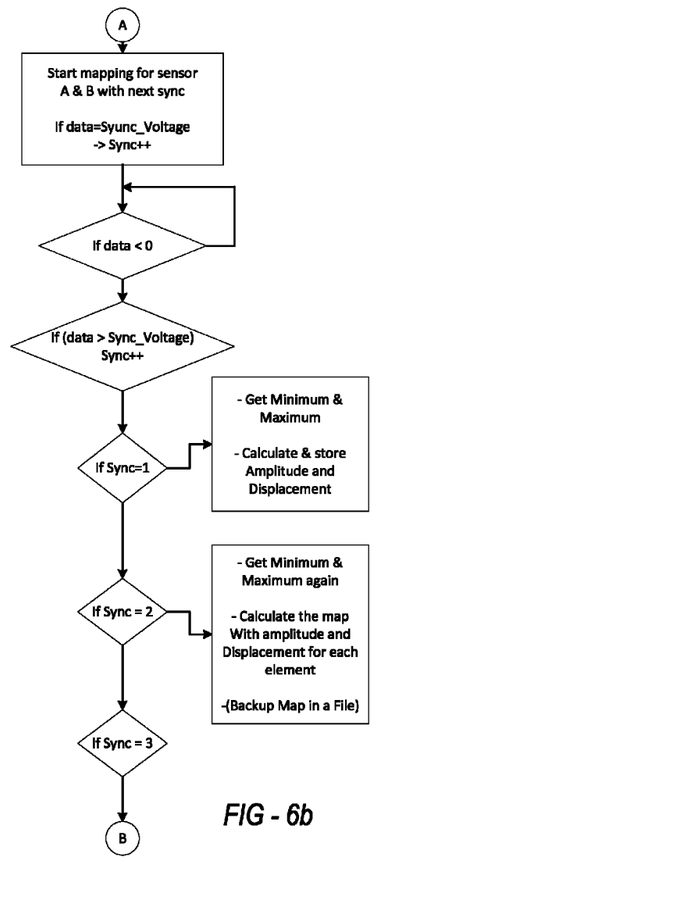

FIG. 6b shows the further sequence of the scan program section which is referred to as mapping. In this program section a kind of map of the chain 23 is created, in order to be able to use this as a reference pattern for determination of the position of the rotor 6. The mapping starts both for the first sensor A and for the second sensor B (Start Mapping for Sensor A & B with next sync). For each rotation, when the sync point is passed the sync counter is incremented by one (If data=sync_Coltage→Sync++). Three sync points are shown in the program sequence (If Sync=1, 2, 3). When creating the map once the sync point 33 (FIG. 3) has been passed, each minimum and maximum of the signal voltage is recorded and stored (Get minimum & maximum). Since the output voltage of the sensor 20 is inversely proportional to the distance between the scanned item (chain) and the sensor 20, a maximum occurs at the ends of the chain element 24 where the distance between sensor 20 and chain 28 is small. The creation of a map takes place from the amplitude and the offset according to the relation:

Offset=½(Maximum−Minimum)

Amplitude=Maximum−Offset

In the flowchart according to FIG. 6b this corresponds to the program step "−Calculate & Store Amplitude and Displacement". This process is repeated until the sync point is passed over again (If Sync=2). As can be further seen from FIG. 6b, the amplitude and the offset are stored in a special data structure or in an array (−Backup Map in a file) and regularly updated. The regular updating is necessary in order to avoid measurement errors and to increase the accuracy of the measurement system, since the output voltage of the two sensors A and B is highly temperature-dependent. Using the data from the last revolution the map is automatically and continuously updated.

Figure 6C:
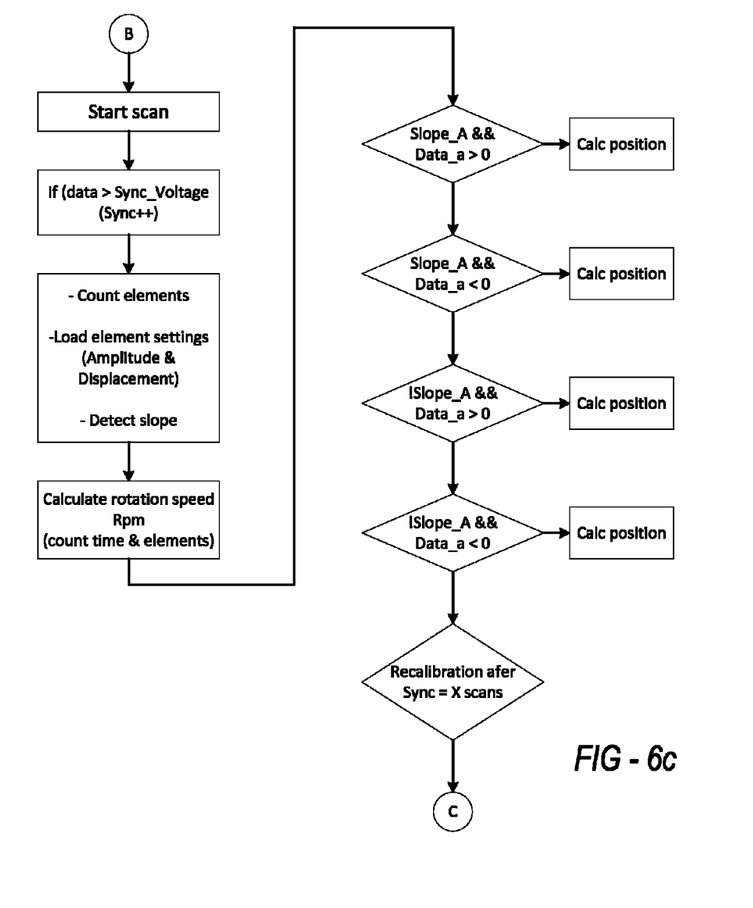

Once the mapping process has taken place and the sync point passed again, the exact localization of this point takes place. The sequence for this is shown in FIG. 6c. This takes place by a measurement value addition of the two offset sensors A and B. This results in a new, overlaid sine function created by addition as can be seen from FIG. 7.

Figure 7:
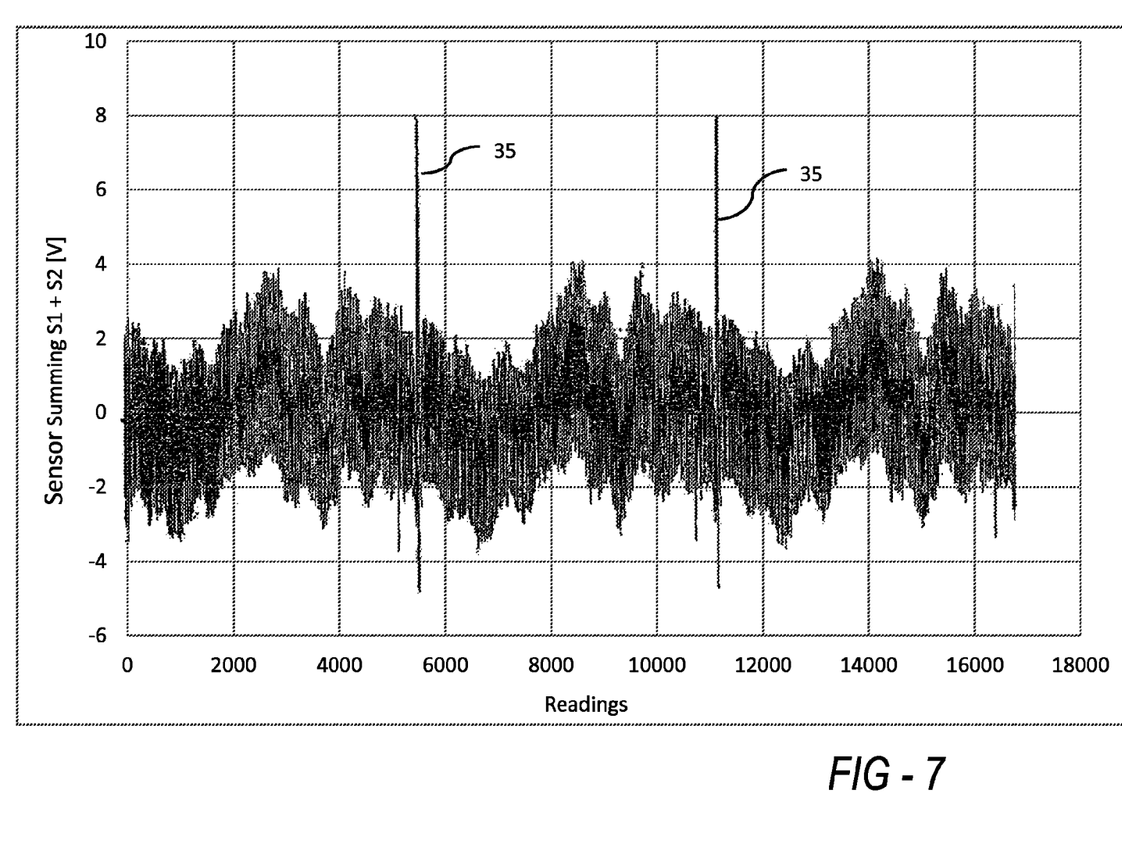
FIG. 7 shows a summed sensor signal from two sensors of the angular position encoder.

In FIG. 7 the summed sensor output voltage of the two sensors A and B over a measurement period is shown. If one of the sensors passes over the sync gap 34 (FIG. 3a), then there is a clear peak 35, which is approximately twice the greatest occurring amplitude. The positive edge of this peak 35 can thus be reliably used as a trigger point. Since two sensors are used, both sensors also pass over the sync gap 34 one after another. Thus two peaks occur (see FIG. 7). While sensor A is in the sync gap, with sensor B the position is determined; if sensor B is in the sync gap 34, sensor A calculates the position.

Once the sync point 34 has been determined (FIG. 3*a*) and compared with the reference pattern the position determination for the rotor shaft 7 of the wind turbine 1 takes place. To do this initially a so-called global position determination is performed with the help of the software in the measurement value evaluation unit 21, at which the position (in angular degrees) is identified only roughly with a certain measurement accuracy and to begin with certain characteristics of the detected sine curve are not taken into account.

The shaft circumference and the length of a chain element 23 are known. Through the rotation of the shaft 7 the number of chain elements 24 is counted from which according to the formula:

$$\frac{\text{Global position}}{360°} = \frac{\text{counted elements} \times \text{chain element length}}{\text{shaft circumference}}$$

the global position determination can be performed. This global position determination however does not yet take account of the partial area in which a chain element 24 or one or both sensors 20 is/are directly located. Furthermore the right amplitude and the offset from the map are also required.

The global position indication is insufficient to achieve the necessary 0.15 degree accuracy. Localization of the sensor 20 in a partial area of a chain element takes place by means of an arc-sin function. This local position calculation takes place using the following function:

$$Y(x) = A \sin(x) + D$$

where
  x=local position of the respective chain element
  Y=voltage value of the sensor
  A=amplitude of the respective chain element
  D=offset of the respective chain element
The local position of the rotor shaft is thus given by:

$$X = \sin^{-1}\left(\frac{y-D}{A}\right)$$

With the help of the global and local position the exact shaft position can now be calculated. For this, however, the software must detect in which section of the sine curve the sensor is directly located. For this, however prior detection of a clockwise and/or anticlockwise direction of the rotor shaft 7 is necessary.

Figure 8:
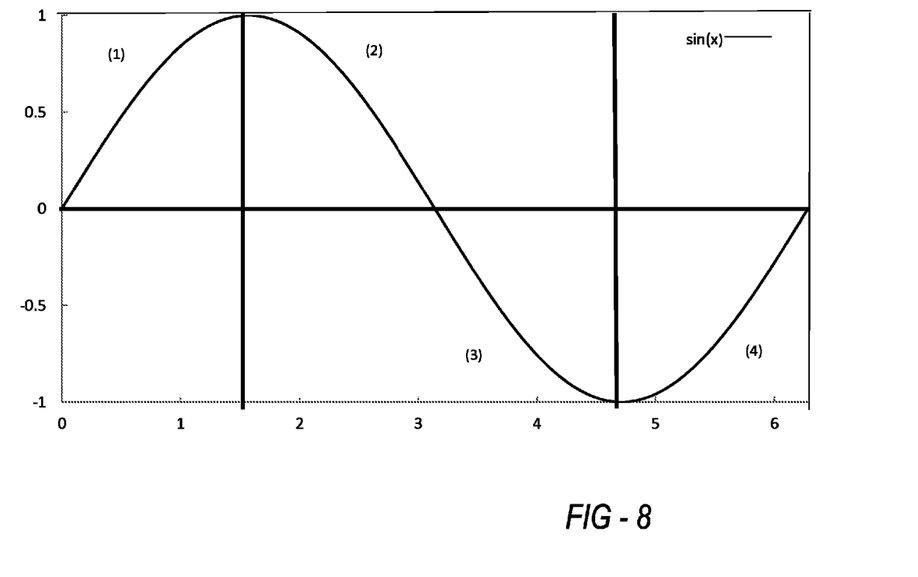
FIG. 8 shows a schematic sensor signal of a sensor for determining the position of the shaft.

FIG. 8 shows a sine curve plotted against a unit value over a full period as a function of a plurality of measurements. The sine curve is divided into 4 areas. The software detects if the sensor 20 is directly in the positive or negative half-wave and if the slope is positive or negative. The areas therefore differ by at least one distinguishing feature (slope, half-wave).
For the calculation of the exact position clockwise the following four cases arise:
  (1) Positive half-wave, positive slope
  (2) Positive half-wave, negative slope
  (3) Negative measurement value, negative slope
  (4) Negative measurement value, positive slope
For the calculation of the exact position clockwise the following cases arise:
Case 1: Global position=Elements·Factor+Local Position×½ Factor
Case 2: Global position=Elements·Factor−Local Position×½ Factor
Case 3: Global position=Elements·Factor+[Local Position]×½ Factor
Case 3: Global position=Elements·Factor−[Local Position]×½ Factor
where
  Elements: Number of counted elements. This corresponds to a half sine-wave.
  Factor: Factor for a half element in degrees (approximately 1.43 degrees, as a function of the shaft diameter).
  Local Position: Part of the sine wave.
  Global Position: Position of the rotor shaft in degrees.
For an additional anticlockwise detection of the rotor shaft 7 additional information is necessary, for which similarly both sensors A and B are required, Since the sine wave has a periodic pattern, the sensor should not be displaced by x.2π rad or x.2π+π rad from the first sensor. If, however, the position of the sensor is calculated according to x.2π+½π rad or x.2π+3/2π rad, for each point of the sine curve sufficient information is obtained in order to be able to detect the position or direction of rotation.

Instead of the four clockwise case distinctions, there are now eight cases (four features each with 2 possibilities) to be distinguished. With the two sensors two slopes can be identified with two detections of the sign of the measured voltage (positive or negative half-wave).

Figure 9:
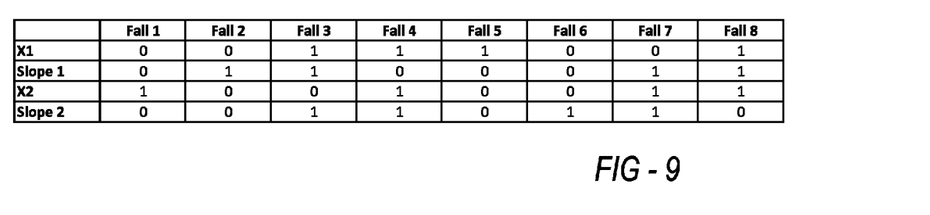
FIG. 9 shows a matrix for case differentiation in position determination.

FIG. 9 shows in a matrix for case differentiation the relationship between slope and sign of the measured voltage (X). The numbers 1 and 2 denote the respective sensors A and B with the following significance:
  X: =Position of the measurement value in the sine wave (0=negative half-wave, 1=positive half-wave).
  Slope: =Slope of the measurement signal (0=negative slope 1=positive slope).
  Case 1-4: =Clockwise.
  Case 5-8: Anticlockwise.

FIG. 6*c* shows the scanning program section taking into account the global and the local position determination, the clockwise (turn RIGHT) and anticlockwise rotation of the rotor shaft 7 and the slope of the measurement signal. The program sequence further comprises the identification of the rotor speed from a time measurement (Calculate Rotation Speed rpm (count time & elements)).

The foregoing description of the embodiments has been provided for purposes of illustration and description of a rotor shaft of a wind turbine for generation of electrical energy. The use and application of the angular position encoder according to the invention is of course not restricted to this application. It can be used in other arrangements also where shafts or rotors are involved, where the determination of the speed and position are necessary, such as for example in electrical generators or drives with a rotor diameter that is very much greater than the link spacing of the roller chain. This description is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An angular position encoder for a rotating shaft comprising:
  a materialized measure arranged around and supported on a circumference of the rotating shaft, the materialized measure including a roller chain having a plurality of roller chain elements, with a pair of free ends of the roller chain being joined together by a chain connecting link;

at least one scanning head in a form of a sensor configured to inductively sense and identify the chain connecting link and the roller chain elements during rotation of the rotating shaft, and further to identify the chain connecting link apart from the roller chain elements; and a measurement value evaluation unit which processes recorded measurement values to give positional and/or speed data on the rotating shaft based on inductive signals generated as the roller chain elements and the chain connecting link pass adjacent the scanning head, wherein the scanning head is arranged at a distance from the materialized measure and the sensor scans a surface of the materialized measure as the rotating shaft is rotating, the surface including both the chain connecting link and the roller chain elements; and wherein the roller chain elements have inner rollers or pins which are aligned in an axial direction of the rotating shaft, and wherein the roller chain is secured with a non-positive form-fit to the circumference of the rotating shaft such that the roller chain does not move rotationally relative to the circumference of the rotating shaft.

2. The angular position encoder according to claim 1, wherein a surface of the inner rollers or pins, which is scanned during a scanning process, produces a sinusoidal analogue pattern.

3. The angular position encoder according to claim 1 wherein the sensor comprises an inductive analogue proximity sensor.

4. The angular position encoder according to claim 1 wherein the sensor comprises at least two analogue sensors arranged a set distance from one another.

5. The angular position encoder according to claim 1 wherein the measurement value evaluation unit further comprises a sequential program with an algorithm which from at least one sensor signal determines the position and/or speed of the shaft.

6. The angular position encoder according to claim 1 wherein the measurement value evaluation unit further comprises a memory in which saved measurement values are stored for comparison with an actually measured value, wherein the actual value is adapted to the saved value.

7. The angular position encoder according to claim 1 further comprising a non-slip strip arranged between the roller chain and a surface of the rotating shaft as a shaft slip and vibration protector.

8. The angular position encoder according to claim 1 wherein the roller chain on the rotating shaft circumference has at least one guide device.

9. The angular position encoder according to claim 8, wherein the at least one guide device has a groove on a scanning surface in which the roller chain is guided.

10. The angular position encoder according to claim 9, wherein the scanning surface has a curvature to match a radius of curvature of the circumference of the rotating shaft.

11. The angular position encoder of claim 8 wherein the at least one guide device comprises a scanning head and the at least one sensor.

12. The angular position encoder according to claim 1 wherein the roller chain has a set synchronization point for a position determination on a surface of the rotating shaft.

13. The angular position encoder according to claim 12 wherein the synchronization point is at the chain connecting link.

14. A method for determination and measurement of a rotor speed or position for a rotating shaft by means of an angular position encoder according to claim 1, wherein at least one reference pattern of the roller chain is created for determination and measurement of the rotor speed or position, and a comparison between at least one pattern and an actual measurement value takes place.

15. The method according to claim 14, wherein the measurement process is initiated by identification of parameters relevant for the measurement and a calibration of the materialized measure.

16. The method according to claim 15, wherein the configuration comprises searching for a synchronization point.

17. The method according to claim 14 further comprising recording and storing signal minimum and maximum values, determining an offset of a roller chain element from the signal minimum and maximum values, and identifying an amplitude.

18. The method according to claim 14 wherein creating at least one reference pattern of the roller chain takes place at a fixed interval and is regularly updated.

19. The method according to claim 14 wherein the comparison of the at least one reference pattern of the roller chain and an actual measurement value comprises identifying a synchronization point.

20. The method according to claim 19, wherein identifying the synchronization point comprises identifying a rising edge of a maximum value of the signal.

21. The method according to claim 19, wherein identifying the synchronization point comprises identifying a difference between two measurement points, wherein the same measurement points are always compared with one another.

22. The method according to claim 19, wherein identifying the synchronization point comprises adding measurement values of two offset sensors.

23. The method according to claim 14 wherein the speed or position identification comprises recording the number of roller chain elements multiplied by a roller chain element length in relation to the circumference of the rotating shaft.

24. The method according to claim 14 further comprising an additional recording which is performed on a section of the roller chain over which the sensor is positioned during speed or position determination.

25. The method according to claim 24, wherein a local position determination is identified by an equation:

$$X = \sin^{-1}\left(\frac{y-D}{A}\right)$$

wherein
- X is the local position of the respective roller chain element;
- y is the measurement value of the sensor;
- A is an amplitude of the respective roller chain element; and
- D comprises an offset of the respective roller chain element.

26. The method according to claim 14 wherein the position determination comprises clockwise/anticlockwise detection of the rotating shaft.

27. The angular position encoder of claim 1, wherein the angular position encoder is configured for use with a wind turbine of a type having:
- a rotor rotatable about a rotor axis having a rotor hub,
- a rotor shaft and at least one rotor blade secured to the rotor hub and running in a direction substantially transverse to the rotor axis, and at least one electrical generator mechanically coupled to the rotor shaft, and wherein the angular position encoder is configured to identify a rotor shaft speed and position.

28. The angular position encoder according to claim 27, wherein the angular position encoder is configured to determine and measure the rotor shaft speed and position by using at least one reference pattern of the roller chain which is created for determination and measurement of the rotor shaft speed or position, and by performing a comparison between at least one pattern and an actual measurement value.

29. An angular position encoder configured for use with a rotating shaft of a wind turbine, the angular position encoder comprising:
- a materialized measure arranged around and supported on a circumference of the rotating shaft immovably relative to the rotating shaft, the materialized measure having a plurality of links and a pair of free ends which are joined by a connecting element, the connecting element defining a synchronization point;
- at least one scanning head in a form of a sensor configured to inductively sense and identify the links and the connecting element during rotation of the rotating shaft, and further to use a sensed angular position of the connecting element as the synchronization point; and
- a measurement value evaluation unit which processes inductive signals generated by the sensor as the links and the connecting element pass adjacent the scanning head, the inductive signals generating information used to create sinusoidal waveforms from which the position and speed of the rotating shaft is determined.

* * * * *